United States Patent Office 3,239,479
Patented Mar. 8, 1966

3,239,479
CEMENT COMPOSITIONS CONTAINING A
POLYMER LATEX
Franklin W. Roenicke, Saginaw, and Albert A. Hill, Midland, Mich., assignors to The Dow Chemical Company, Midland, Mich., a corporation of Delaware
No Drawing. Filed Jan. 23, 1961, Ser. No. 83,892
13 Claims. (Cl. 260—29.7)

This invention pertains to an improved inorganic cement, and more particularly to a Portland type cement containing a latex to which an additament is added to retard the setting time and tendency of the cement to crack upon setting.

A latex-containing cement composition, such as concrete and mortar, especially Portland cement mortar, has been used in a number of applications. The latex containing mortar compositions are ideally suited to be employed in construction in patching, resurfacing, and repair of wooden and concrete floors, concrete pavements, roads, airfield runways, bridge floors, floor underlayments, ceramic tile grout and bedding work, Portland cement plasters, coatings for industrial insulations, ornamental structures, as brick and cement block mortars in applications requiring improved resistance and higher strength, and in precast concrete slabs, panels, beams, sections, and miscellaneous forms. The mortar compositions are particularly widely used in resurfacing and patching of roadways and runways where a relatively thin coating, for example of about ½ inch, is used. When the cement or mortar is used for this purpose it is essential that in addition to having the necessary compressive and tensile strength the compositions have the required shear bond strength and flexure strength to adhere to the surface being coated. Since the surfaces resurfaced such as roads and runways are exposed to atmospheric elements, the coating or cement compositions must have sufficient flexure strength and flexibility to withstand the normal contraction and expansion of the roadway or runway due to the changes in atmospheric conditions and variations in load.

It is often desirable to have a cement composition which does not set rapidly. A slow setting cement composition is desirable since it provides time to work the cement composition into a desired shape and finish prior to setting. Movement or working of the cement composition after it has begun to set results in a weakened product. Upon setting of a latex-containing cement composition, a film is usually formed on the top surface of the cement composition. This film seals the surface and prevents the moisture from evaporating. For some unspecified reason a cement composition containing latex has a tendency to crack upon setting unless the setting conditions, such as a temperature, are closely controlled. When a cement mortar is used for resurfacing of roads or bridges, for example, it is impractical to attempt to control the ambient setting conditions.

While numerous setting retardants have been proposed for hydraulic cements, most of these are not entirely satisfactory for a latex-containing cement composition. Some of these retardants are totally ineffective, while others will delay the setting time of the cement composition but will have a deleterious effect upon the strength of the composition or nullify all of the advantages gained by the addition of the latex.

It is therefore an object of this invention to provide a cement composition containing a latex which will not have a tendency to crack upon setting and a method for its preparation. A further object is to provide a cement composition containing latex which will have a delayed setting time.

The above and other objects are attained according to the invention by intermixing prior to setting from 1.0 to 10 weight percent, based upon the dry cement in the composition, of diethylene glycol or triethylene glycol. With the addition of diethylene glycol or triethylene glycol in a small amount, a latex-modified cement composition is obtained which has a considerably longer setting time than does a similar composition which does not contain diethylene glycol or triethylene glycol. In addition to the increased setting time, the tendency of a glycol-modified latex-containing cement composition to crack upon setting is eliminated. By addition of the glycol, some of the properties of the cement composition are somewhat improved making the cement composition more desirable for external use or placement.

The mechanism through which the desirable results are obtained by the use of the particular additament is not known. It can be speculated that the glycol functions as a humectant and that its addition to the latex-containing cement may in some manner retard or change the formation of the latex film formed immediately upon drying such that the internal stresses developed during the setting of the cement are reduced or relieved. This advantage is obtained with the latex-containing inorganic cement compositions. The cement compositions to which the latex is added consist generally of an inorganic settable material, such as hydraulic, Portland, natural, or aluminous cement, an aggregate material, and water. The amount and proportions of the latex and other constituents making up the cement composition are generally not varied from that normally used when the diethylene or triethylene glycol humectant is used. The optimum benefit of the particular additament is obtained with Portland cement compositions.

While sand may be most often used as an aggregate, stone, gravel, pebbles, granites and other fillers, which may serve the same conventional purpose as sand, may be used. Undoubtedly the end use of a mortar or cement composition determines the particular size of the aggregate and which aggregate is to be used. In resurfacing of pavements for example with a relatively thin layer, i.e. ½ inch or so, the aggregate employed would be essentially sand. If any pebbles or stones were present they would have to be of a relatively small particle size.

Numerous latexes have been added to cement compositions. These latexes are aqueous colloidal dispersions of interpolymeric thermoplastic substances which may be manufactured by the emulsion polymerization of addition interpolymerizable polymers or by the aqueous dispersion of finely divided particles of such an interpolymer which is stable when mixed with concrete, mortar, and preferably Portland cement. Examples of these latexes are the well known styrene-butadiene interpolymers; vinylidene chloride latexes obtained by interpolymerization of vinylidene chloride with vinyl chloride, and an acrylate; styrene-acrylate latexes or polyvinyl acetate latexes.

Some of the vinylidene chloride latexes which are commonly used in cements are described in detail in a patent application Serial No. 78,293, filed on December 27, 1960, now abandoned, by coworkers R. Douglas Eash and Richard B. Drubel. The vinylidene chloride latexes described in the above cited patent application are especially beneficial in Portland concrete and mortar increasing the strength and making the product especially adaptable to thin resurfacing applications.

These latexes are interpolymers wherein the major polymeric constituent is vinylidene chloride which is present in the latexes in proportions of from about 50 to about 90 percent by weight being interpolymerized with about 50 to about 10 percent by weight of at least one interpolymerizable material. The interpolymerizable material may be composed of at least one monomer having the general formula:

$$CH_2=C-X$$
$$\quad\quad |$$
$$\quad\quad R$$

wherein "R" is hydrogen or the methyl group and "X" is selected from the group consisting of —CN, halogens of atomic numbers 9 to 35, and ester forming groups —COOY, wherein "Y" is a primary or secondary alkyl group containing up to and including 18 carbon atoms.

Illustrative of monomeric materials applicable in the preparation of suitable interpolymer latexes would be methyl acrylate, ethyl acrylate, propyl acrylate, isopropyl acrylate, butyl acrylate, isobutyl acrylate, sec.-butyl acrylate, tert.-butyl acrylate, amyl acrylate, isoamyl acrylate, tert.-amyl acrylate, hexyl acrylate, 2-ethylhexyl acrylate, cyclohexyl acrylate, octyl acrylate, 3,5,5-trimethylhexyl acrylate, decyl acrylate, dodecyl acrylate, octyl acrylate, octadecenyl acrylate, methyl methacrylate, ethyl methacrylate, propyl methacrylate, butyl methacrylate, n-amyl methacrylate, sec.-amyl methacrylate, 2-ethylbutyl methacrylate, octyl methacrylate, phenyl methacrylate, cyclohexyl methacrylate, 3,5,5-trimethylhexyl methacrylate, decyl methacrylate, dodecyl methacrylate, and octadecyl methacrylate and butoxyethyl acrylate or methacrylate or other alkoxyethyl acrylates or methacrylate, vinyl chloride, acrylonitrile, methacrylonitrile, and the like.

Particularly effective latexes are the interpolymers containing vinylidene chloride, vinyl chloride, and ethyl acrylate in approximate percentage weight proportions of 70:20:10, 50:40:10, and 75:20:5, respectively; a vinylidene chloride, vinyl chloride and 2-hexylacrylate interpolymer latex the polymeric materials being present in approximate percentage weight proportions of 52:35:13 respectively; a vinyl chloride and acrylonitrile interpolymer, the polymeric components being present in approximate percentage weight proportions of about 89:11 respectively; and particularly an interpolymer latex containing about 75 weight percent of vinylidene chloride and about 20 weight percent vinyl chloride, about 3 weight percent ethyl acrylate and about 2 weight percent of methyl methacrylate. Optimum results are obtained with the humectants used in cement compositions containing the above vinylidene chloride latexes, in addition to cement compositions containing the well known styrene-butadiene latexes.

Generally from 1.0 to 10 percent, based upon the weight of the dry cement in the composition, of the humectant is used. The optimum amount will vary somewhat with the particular cement, the latex, and the amount of the latex employed. Optimum results are usually obtained with concentrations of the humectant in the range of 1 to 5 weight percent of the dry cement in the composition. For a Portland cement mortar employing a styrene-butadiene latex or the vinylidene chloride latex described above, the optimum result is obtained with the humectant being in the range of 1 to 5 weight percent, preferably 2 to 4 weight percent of the dry cement. With the acrylic latexes somewhat smaller amounts of the humectant are preferred. When the amount of latex employed in the cement is greater than the usual range of from 5 to 30 weight percent of latex solids, based upon the weight of dry cement and aggregate, the preferred amount of the humectant is somewhat increased and may vary in the range of from about 4 to 5 weight percent and may possibly be as high as 7 weight percent based on the dry weight of the cement in the composition.

Although the humectant may be added anytime in the preparation of the mortar or the concrete, it is most conveniently added with the water or as a last ingredient prior to the intermixing of the ingredients of the cement composition. A minute proportion of an antifoaming agent, for example an emulsion containing about 10 percent solids of dimethylsiloxane and 4 weight percent silica acrogel emulsified with an anionic or cationic emulsifying agent is usually to the cement containing the latex. The antifoam agent improves the compressive, tensile, and shear bond strengths of the latex-containing cement compositions. The amount of water added to the concrete or mortar compositions depends largely upon the consistency of the cement composition desirable for the particular application. After the ingredients are thoroughly comingled and mixed to obtain the desired smoothness of texture, the cement composition may be poured into forms, or spread over a surface or area and then troweled to smooth the surface if desired.

To further illustrate the increase in setting time obtained by use of the humectants a series of cement compositions was made to which given percentages of the humectants were added. The setting times of these compositions were determined and compared to the setting times obtained with the same compositions to which no humectant was added.

In preparing the compositions the sand and Portland cement were thoroughly mixed while in a dry state. The water, the latex and the antifoaming agent were combined and added to the sand-cement mixture. The humectant was then added and the composition was mixed in a Hobart type mixer until a product of even consistency was obtained (requiring about 4 to 5 minutes). Samples of the formulation were taken and the setting time determined according to ASTM accepted test C-254-52 in which Westvaco's needles were used.

Cement compositions containing different latexes were used. A formulation was made where Portland cement, sand, water, and a latex wherein the polymer was one containing approximately 67 weight percent of styrene and 33 weight percent of butadiene were intermixed and this composition was tested to determine the setting time with and without the humectants. On the basis of 100 parts of the Portland cement by weight, 300 parts of sand, 24 parts of water, and 15 parts of latex polymer solids were intermixed to form the composition. In addition to the above ingredients, approximately 0.3 part of an emulsion containing about 10 weight percent solids of dimethylsiloxane and 4 weight percent of silica acrogel was added as an antifoaming agent. The setting time obtained for the above composition with and without the humectants is shown in the table below.

TABLE I

| Humectant | Weight ratio of humectant to cement, humectant/cement | Setting time | |
|---|---|---|---|
| | | Initial, hrs. | Final, hrs |
| Diethylene glycol | .02 | 3¾ | 6¾ |
| Do | .05 | 5½ | 9 |
| Triethylene glycol | .02 | 7½ | 10½ |
| Do | .05 | 4½ | 7 |
| | | 7¾ | 10½ |

A second formulation similar to that above was prepared except that a vinylidene chloride latex was used in place of the styrene-butadiene latex. The polymer portion of the latex used contained approximately 74 weight percent of vinylidene chloride, 20 weight percent vinyl chloride, and 3 weight percent acrylonitrile. The ratio of the ingredients was the same as that above with the exception that 27 parts of water per 100 parts of cement were used instead of the 24 parts. The setting time obtained with and without the humectants is shown in the table below.

TABLE II

| Humectant | Weight ratio of humectant to cement, humectant/cement | Setting time | |
|---|---|---|---|
| | | Initial, hrs. | Final, hrs. |
| | | 4 | 7 |
| Diethylene glycol | .02 | 5 | 8½ |
| Do | .04 | 5½ | 8½ |
| Triethylene glycol | .02 | 4½ | 6½ |
| Do | .04 | 5 | 8 |

A third formulation was made wherein a polyvinyl acetate latex similar to a product sold by the Celanese Corporation under the trade name Vinac was used in place of the latexes above. The ratios of the ingredients in the formulation were the same as above except that 28 parts of the latex and 27 parts of water per 100 parts of cement were used. Without the humectant present, the formulation began to set in about 5 hours and set was completed in about 8. With 2 weight percent of diethylene glycol, based upon the dry cement, the initial setting time was increased to approximately 5½ hours and it required approximately 9 hours before the cement had set. With 5 percent of diethylene glycol the initial setting time was extended to approximately 6 hours.

A fourth formulation was made where an acrylic latex was used in the cement formulation. Approximately 33 parts of the acrylic latex per 100 parts of the cement were used. Also in the formulation the amount of water used was 24 parts by weight per 100 parts of cement. Without the use of the humectant an initial setting time of approximately 5¾ hours was required. The final setting time was approximately 9½ hours. The addition of approximately 2 weight percent of diethylene glycol or triethylene glycol increased the initial and final setting time about 1 hour.

To illustrate the shrinkage cracking obtained in the latex-containing cements, a formulation similar to the second formulation above using a vinylidene chloride latex was prepared with the ingredients being in the same ratio as that above. Upon mixing the formulation it was poured into a mold of about 12 inches square and ½ inch thick. To accelerate the drying and setting time, an infrared heater was placed approximately 15 inches above the sample and an electric fan was used to blow air over the surface of the mortar. Upon setting, numerous shrinkage cracks developed, extending approximately across the whole piece.

The run was repeated except that to the formulation 2 percent by weight, based upon the dry cement, of diethylene glycol was added. Upon drying the cement composition under the same conditions as above no cracking was obtained. The same results were obtained when the humectant content was increased to 4 percent. Similar results were obtained with triethylene glycol.

For the first two formulations above where the latex used contained a styrene-butadiene polymer and a vinylidene chloride polymer, respectively, samples of the formulation were taken and upon setting, the compressive strength, tensile strength, shear bond strength and flexure strength were determined. The compressive strength tests were made according to ASTM testing procedures C-109-58 using 2 inch cubes. The tensile strength tests were also made according to ASTM procedure C-190-58 using briquets. The flexure strength tests were made on flex bars 2⅜ inches long, 2 inches wide and ½ inch thick. ASTM testing procedures C-192-59 and C-293-59T were used.

In performing the tests the formulations were made in the manner described above. Upon mixing the combined ingredients in a Hobart type mixer for from 4 to 5 minutes an even distribution of the ingredients was achieved. The formulation thus prepared was immediately placed by pouring and leveling the formulation in the appropriate test molds. In the molds the formulation was allowed to set or cure for about 14 days at 70° F. at about 50 percent relative humidity. By that time the mortar moldings were thoroughly hardened.

A shear bond test method was devised to give more reliable correlations between property values obtained in the laboratory and actual field experience. According to this method, a cylindrical standard concrete specimen is molded by pouring a sufficient amount of ordinary Portland cement concrete into a cylindrical plastic-lined, cardboard carton. The cylindrically-shaped carton is open at one end and has such interior dimensions as would insure the formation of a solid concrete test specimen six inches in length and 3⅜ inches of outside diameter when completely cured and aged. The walls of the cardboard mold are sufficiently thick to act as a firm and sturdy base on which to support the carton in upright position. Before the mortar is poured into the upright mold, a 3¼ inch plastic disc is fitted in the bottom of the cylindrical cardboard carton to form a mold with a smooth regular inner bottom surface.

The mold is filled completely with the standard concrete mixture while the mold is erect as indicated above. Initially the concrete is allowed to cure in the mold at room temperature for about 24 hours. Thereafter the same concrete cylinder is completely submerged in water at room temperature for about 5 days of wet curing. Finally the wet cured sample is permitted to age in the mold at room temperature for approximately an additional 22 days.

Following the aging, the open end mold is inverted and the top surface of the sample (which was originally the bottom surface, as poured) is sanded to a smooth finish on a belt sander. Precaution is taken to keep the top surface of the concrete cylinder wet during the sanding operation to avoid unnecessary heating of the cured concrete due to friction.

Having smoothly ground the top surface of the aforementioned concrete cylinder in its mold, another short section of the same cylindrical plastic-lined cardboard is placed, aligned, and securely fastened over the top of the smoothed surface of the cylinder making a mold of adequate size so as to contain a 1 inch thick mortar cap of the latex-containing cement composition. Hereafter, this concrete cylinder is capped with the required amount of latex-containing mortar with the following procedure; (1) about ⅓ of the cylindrical cap is filled with mortar. The mortar is brushed onto the smooth surface of the concrete cylinder after which the mortar is packed down by tamping with a non-absorptive, medium-hard, rubber tamper about 21 times. (2) Approximately ⅓ more of the mortar is then poured into the cap and the added mortar is again tamped about 21 times. (3) The remaining ⅓ of the mortar is eased into the cap, tamped about 21 times, and the surface of the mortar is finally troweled to a smooth finish.

The 1 inch, wet, latex-containing concrete mortar cap thus molded is thereafter cured for 14 days at approximately 70° F. at a relative humidity of about 50 percent. When the cap containing the latex modified cement composition has cured and aged sufficiently, the capped concrete cylinder is placed on its side and is inserted in a metal sleeve slightly larger than the concrete cylinder. The 1 inch mortar cap is allowed to extend beyond the metal sleeve. A metal ram is lowered onto the metal cap as close to the concrete cylinder as possible so as to exert a force perpendicular to the main axis of the cylinder. A constantly increasing load is applied to the ram until the sample fails. The force exerted by the weighted ram is measured in pounds. The value so determined, is converted to pounds per square inch by dividing the force in pounds, exerted by the weighted ram, by the cross-sectional area of the cylinder.

In the tests both the dry and wet strengths were determined. In determining the wet strengths, samples which had already been cured 14 days dry as above were additionally cured 14 days while immersed in water at 70° F. Strengths were then determined while the samples were still wet as per the accepted procedures.

The results obtained with the formulations containing the humectant and without the humectant are shown in the tables below:

CEMENT FORMULATION CONTAINING STYRENE-BUTADIENE LATEX

| | Blank (No humectant) | Formulation with diethylene glycol, weight percent, based upon dry cement | | Formulation with triethylene glycol, weight percent, based upon dry cement | |
|---|---|---|---|---|---|
| | | 2.0% | 5.0% | 2.0% | 5.0% |
| Compressive strength, lb./sq. in.: | | | | | |
| Dry | 3,990 | 3,930 | 3,230 | 3,510 | 3,020 |
| Wet | 3,690 | 3,280 | 3,150 | 2,930 | 3,060 |
| Tensile strength, lb./sq. in.: | | | | | |
| Dry | 590 | 640 | 440 | 650 | 490 |
| West | 520 | 460 | 380 | 410 | 380 |
| Shear bond strength, lb./sq. in.: | | | | | |
| Dry | 490 | 680 | 730 | 550 | 510 |
| Wet | 440 | 600 | 520 | 520 | 470 |
| Flexural strength, lb./sq. in.: | | | | | |
| Dry | 1,430 | 850 | 440 | 740 | 590 |
| Wet | 920 | 720 | 650 | 770 | 660 |

CEMENT FORMULATION CONTAINING VINYLIDENE-CHLORIDE LATEX

| | Blank (No humectant) | Formulation with diethylene glycol, weight percent, based upon dry cement | | Formulation with triethylene glycol, weight percent, based upon dry cement | |
|---|---|---|---|---|---|
| | | 2.0% | 5.0% | 2.0% | 5.0% |
| Compressive strength, lb./sq. in.: | | | | | |
| Dry | 4,890 | 5,450 | 3,760 | 4,640 | 3,350 |
| Wet | 3,330 | 4,440 | 4,140 | 4,220 | 3,090 |
| Tensile, strength, lb./sq. in.: | | | | | |
| Dry | 760 | 890 | 580 | 850 | 630 |
| Wet | 500 | 570 | 470 | 590 | 420 |
| Shear bond strength, lb./sq. in.: | | | | | |
| Dry | 710 | 510 | 580 | 540 | 460 |
| Wet | 680 | 570 | 470 | 570 | 610 |
| Flexural strength, lb./sq. in.: | | | | | |
| Dry | 1,390 | 1,540 | 1,510 | 1,360 | 1,160 |
| Wet | 960 | 870 | 1,060 | 950 | 930 |

What is claimed is:

1. A Portland cement mortar composition which comprises a mixture of Portland cement, an aggregate material, water, a polymer latex, and a humectant selected from the group consisting of diethylene glycol and triethylene glycol in an amount of from 1.0 to 10 weight percent, based upon the dry weight of the cement in the composition.

2. A composition according to claim 1 wherein the polymer in the latex is a styrene-butadiene interpolymer.

3. A composition according to claim 1 wherein the humectant is diethylene glycol and is present in the composition in an amount of from 1 to 5 percent, based upon the weight of the dry cement in the composition.

4. A composition acording to claim 1 wherein the humectant is triethylene glycol and is present in an amount of from 1 to 5 weight percent, based upon the weight of the dry cement in the composition.

5. A composition according to claim 1 wherein the aggregate is sand.

6. A process for the preparation of an improved latex-containing Portland cement mortar, which comprises adding a mixture of Portland cement, aggregate material, a polymer latex, water and from 1.0 percent to 10.0 percent, based on the weight of the dry cement, of a humectant selected from the group consisting of diethylene glycol and triethylene glycol, intermixing the humectant with the mixture, and placing the resulting mixture in a confined area until the cement has set.

7. A process according to claim 6 wherein the humectant is diethylene glycol and is added to the mixture in an amount of from 1 to 5 percent by weight based on the dry weight of the Portland cement present in the mortar.

8. A process according to claim 7 wherein the humectant is triethylene glycol and is added to the mixture in an amount of from 1 to 5 percent by weight based on the dry weight of the Portland cement present in the mortar.

9. In a process of resurfacing concrete surfaces, which comprises intermixing with Portland cement, an aggregate material, a polymer latex, and water, to make a slurry, the improvement consisting essentially of incorporating in said slurry a humectant selected from the group consisting of diethylene glycol and triethylene glycol in an amount of from 1.0 to 10 weight percent based upon the dry weight of the Portland cement to thereby form a smooth working consistency mortar, and spreading the resulting mortar over the concrete surface to be resurfaced in a layer of from ¼ to 4 inches thickness.

10. A process according to claim 9 wherein the aggregate material is sand.

11. A process according to claim 10 wherein the latex is a styrene-butadiene polymer dispersion.

12. A process according to claim 11 wherein the polymer in the latex is an interpolymer dispersion composed of from about 50 to 90 percent vinylidene chloride and correspondingly from about 50 to 10 percent to make a 100 percent by weight of polymer of an interpolymerizable material, said interpolymerizable material being composed of at least one monomer of the general formula:

$$CH_2=C-X \atop R$$

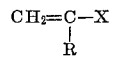

wherein R is hydrogen or a methyl group and X is selected from the group consisting of —CN, halogens of atomic number 9 to 35, and ester forming groups —COOY, wherein Y is selected from the class consisting of primary and secondary alkyl groups containing up to and including 18 carbon atoms, said aqueous latex interpolymer being intermixed in proportions of from about 5 to 30 percent by weight of latex solids as based on the total dry weight of the Portland cement and aggregate material.

13. A composition according to claim 1 wherein the polymer in the latex is composed of between about 74 percent and about 90 percent by weight of vinylidene chloride and correspondingly between about 20 percent and 50 percent by weight of vinyl chloride, and up to about 3 percent by weight of acrylonitrile to make a 100 percent polymer.

References Cited by the Examiner

UNITED STATES PATENTS

| 1,998,667 | 4/1935 | Fritz | 106—90 |
| 2,225,146 | 12/1940 | Bechtold | 106—90 |
| 2,662,064 | 12/1953 | Mead | 260—29.7 |
| 2,771,824 | 11/1956 | Patch et al. | 260—29.7 |

(Other references on following page)

UNITED STATES PATENTS

| | | | |
|---|---|---|---|
| 2,795,564 | 6/1957 | Conn et al. | 260—29.6 |
| 2,948,201 | 8/1960 | Nagen et al. | 260—29.7 |

FOREIGN PATENTS

| | | |
|---|---|---|
| 635,486 | 4/1950 | Great Britain. |
| 785,406 | 10/1957 | Great Britain. |
| 804,358 | 11/1958 | Great Britain. |

OTHER REFERENCES

Griffiths: "Transactions of the Institution of the Rubber Industry," vol. 22, pp. 170–174 (1946).

MURRAY TILLMAN, *Primary Examiner.*

DANIEL ARNOLD, LEON J. BERCOVITZ, LOUISE P. QUAST, *Examiners.*